Figure 1:
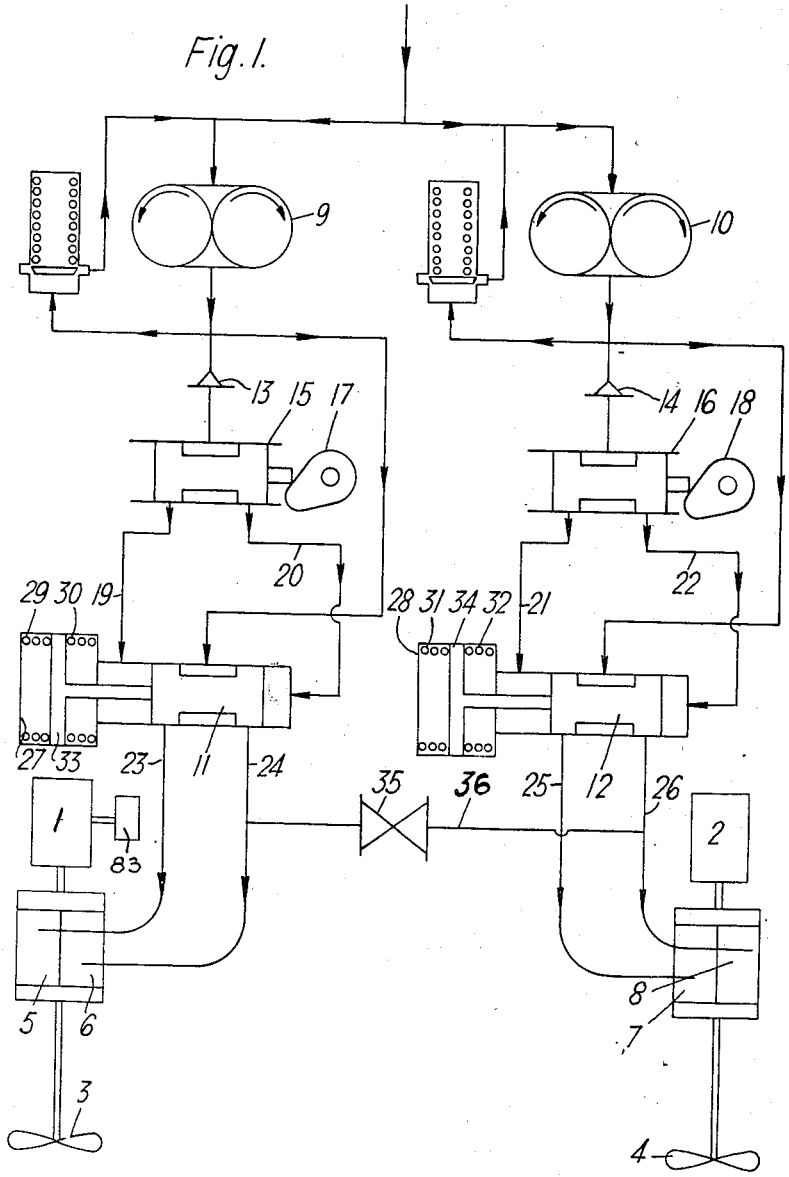

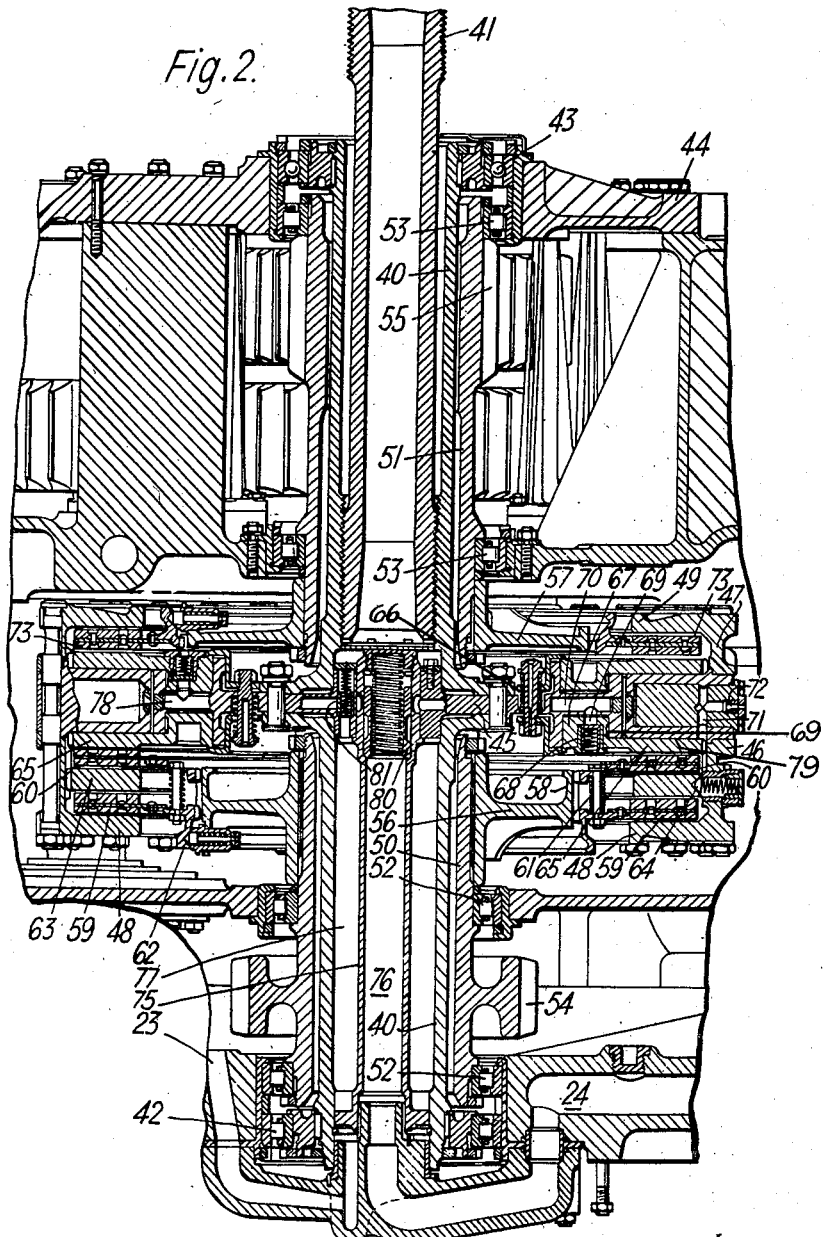

United States Patent Office 2,822,669
Patented Feb. 11, 1958

2,822,669

POWER TRANSMISSION MECHANISMS

George Hamilton Murray, Pinner, Middlesex, and Peter Roy Smith, Prestbury, Cheltenham, England, assignors to D. Napier & Son Limited, London, England, a company of Great Britain Application March 22, 1955, Serial No. 495,846

Claims priority, application Great Britain March 25, 1954

7 Claims. (Cl. 60—97)

This invention relates to power transmission mechanism incorporating fluid operated friction clutches of the kind including two relatively rotatable friction members and a fluid operated ram piston and cylinder assembly or the equivalent arranged to move the two parts to engage or disengage the clutch. The invention is particularly applicable to clutches of the kind having means for permitting permanent escape of fluid therefrom.

Where the fluid to operate the clutch is derived from a pump driven by the prime mover to which the clutch is connected, the clutch cannot normally be engaged unless the prime mover is running, and this prevents the prime mover being started by power transmitted through the clutch.

It is an object of the invention to overcome this difficulty and according to the invention a marine propulsion unit of the twin-screw type includes two prime movers each coupled to a propeller through a fluid operated clutch, of the kind having means for permitting permanent escape of fluid therefrom, the fluid to operate each clutch being normally derived from a pump driven by the respective prime mover, means for starting one prime mover, as by an auxiliary starter motor, and means for starting the second prime mover indirectly from the first, including means for connecting the hydraulic fluid circuit associated with the first prime mover and its clutch to the clutch of the second prime mover so as to engage the clutch of such second prime mover so that torque imparted to the propeller of the second prime mover by reason of the ship's motion drives the second prime mover in a direction to cause it to start.

A further object of the invention is to provide an improved fluid operated clutch of the type referred to which will respond quickly to variations in the pressure of the operating fluid, irrespective of the length of the hydraulic conduit through which the operating fluid is supplied to the operating ram of the clutch.

Thus according to a preferred feature of the invention at least one of the fluid operated friction clutches (and preferably both the "ahead" clutches, when each propeller is connected to alternative "ahead" and "astern" clutches) includes means for permitting escape of fluid from the cylinder and a pressure sealing valve arranged directly in the conduit between the pump and the ram cylinder and adjacent to the latter, and arranged to open when the pressure in the conduit rises above a predetermined value, and to close when the pressure falls below this value so as to prevent the escape of fluid from the conduit when the cylinder empties and thus maintain the conduit substantially full of fluid at all times.

In one preferred construction the ram piston and cylinder assembly comprises an annular member mounted in an annular chamber coaxial with the two movable friction members, and the fluid conduit includes an internal passage coaxial with the two friction members and communicating with the ram chamber through one or more radial passages, and the pressure sealing valve is housed within the internal passage.

Moreover the means for permitting the escape of fluid from the ram cylinder preferably comprises a permanent bleed to relief.

The propulsion unit preferably includes control valves in the hydraulic pressure conduits through which fluid is delivered to each clutch, an interconnecting conduit communicating with points on the pressure conduits between the control valves and the respective clutches, and a valve in the interconnecting conduit by which the two pressure conduits may be interconnected or made independent as desired.

Preferably each control valve is so arranged that in the absence of pressure fluid from its respective prime mover it occupies a closed position in which the supply of fluid to the associated clutch is shut off, the prime mover thus being allowed to idle in neutral. Thus, in conjunction with the pressure sealing valve associated with each clutch, both ends of the fluid delivery conduit to the clutch ram piston, are sealed off to prevent fluid escaping therefrom.

According to another preferred feature of the invention each control valve is of the shuttle type, and the propulsion unit includes a two-way pilot valve hydraulically connected to the same source of pressure and arranged to deliver pressure fluid selectively to opposite ends of the shuttle valve to move it into one or other of its operative positions, and means for centralizing the shuttle valve in an intermediate position in which the supply of fluid to both clutches is shut off, when the pressure fluid to the pilot valve fails.

The invention may be performed in various different ways but one specific embodiment will now be described by way of example as applied to a twin engine twin screw propulsion unit for a high speed boat.

In the accompanying drawings Figure 1 is a diagrammatic representation of the hydraulic clutch operating mechanism, and Figure 2 is a sectional side elevation through one of the clutches.

This particular power installation comprises two high powered compression ignition engines 1 and 2 each connected to a separate propeller 3 and 4, through alternative "ahead" and "astern" parallel transmission paths each path including a separate hydraulically operated friction clutch 5, 6, 7, 8.

The pressurized operating fluid for the "ahead" and "astern" clutches of each engine is derived from a gear pump 9, 10 driven directly by the respective engines 1 and 2. The output side of each gear pump 9, 10 is connected to the input port of a reversing type shuttle control valve 11, 12 and is also connected through a non-return valve 13, 14 to the input port of a pilot two-way piston type selector valve 15, 16 the piston of which is mechanically controlled by a cam 17, 18 arranged to be operated manually by a member which constitutes a main "ahead-astern" maneuvering control for the particular engine. The two outlet ports of the pilot selector valves 15, 16 are connected respectively via conduits 19, 20, 21, 22 to pressure chambers at opposite ends of the shuttle valves 11, 12 while the two outlet ports of the shuttle valve are connected respectively via conduits 23, 24, 25, 26, to the hydraulic operating rams of the ahead and astern clutches 5, 6, 7, 8. The moving part of each shuttle valve 11, 12 is mechanically connected to a centralizing unit 27, 28 including two opposed springs 29, 30, 31, 32 acting on an intermediate member 33, 34 which acts to hold the moving part of the shuttle valve in a central position in which the supply of hydraulic fluid to both clutches 5 and 6, or 7 and 8 is cut off.

Thus when one engine 1 or 2, is running, and its gear pump 9 or 10 is delivering hydraulic fluid under pressure to the input port of the respective pilot selector valve 15 or 16, movements of this pilot selector valve into one or other of its two operative positions causes the pressure fluid to be delivered to one end or other of the shuttle valve 11 or 12 and the shuttle valve jumps across to connect the operating ram of either the ahead or astern clutch 5, 6, 7, 8, as the case may be to the source of hydraulic pressure.

For starting purposes it is necessary to provide an auxiliary starter motor for at least one of the engines, but it is convenient and economical in weight, space and cost, for the other engine to be started directly or indirectly from the first engine. In this example the fluid conduits connecting the output ports of the two shuttle valves to the respective ahead clutches 6, 8, of the two propellers are interconnected by a fluid conduit 36, in which is arranged an on-off "trailing" control valve 35. Normally this trailing control valve is closed and the supply of hydraulic fluid to operate either of the two clutches 5, 6, or 7, 8, associated with each engine is derived solely from the gear pump 9, 10 associated with that engine. When the trailing valve 35 is open however the pressure fluid derived from one engine can be made available to engage the "ahead" clutches of both propellers, and so permit the second engine to be started by the reverse torque in its propeller shaft derived from the motion of the boat. To start the power plant the trailing valve 35 is closed and the auxiliary starter motor (not shown) is actuated to start one of the engines (for example engine 1) and with its gear pump 9 delivering hydraulic fluid under pressure, the "ahead" clutch 6 associated with that engine is engaged and the boat is set in motion.

Under these conditions it is impossible to engage either of the clutches 7, 8, associated with the second engine 2 since the gear pump 10 of the second engine is inoperative and there is no pressure fluid available to engage either of the clutches of the second engine.

As soon as the boat is moving at an appreciable speed however, the trailing control valve 35 is opened and pressure fluid from the first engine gear pump 9 is delivered through the interconnecting conduit 36 to the operating ram of the ahead clutch 8 of the second engine. The second engine main maneuvering control is set to the ahead position to move the selector valve 16 also into the ahead position, so that as soon as hydraulic fluid is delivered by the second gear pump, when the second engine starts, the shuttle valve 12 will be moved or maintained in its ahead position in which hydraulic fluid from the gear pump 10 is passed to the ahead clutch 8. With the boat under way, the propeller 4 associated with the second engine 2 then transmits reverse torque through the associated ahead clutch 8 to start the second engine, and as soon as the gear pump 10 associated with this engine is running at a speed sufficient to supply the necessary pressure fluid to maintain the ahead clutch 8 in engagement the trailing control valve 35 may be closed and the two clutch control units then again become separately and independently operable.

The ahead and astern clutches 5, 6, and 7, 8, associated with each propeller are preferably mounted in a common assembly, and one such assembly will now be described in detail.

The assembly comprises a hollow input shaft 40, connected through a coupling shaft 41 to the output shaft of the engine and supported in bearings 42, 43 at opposite ends of a fluid-tight casing 44. A radial flange member 45 is secured to a mid-point of the input shaft, this flange member being secured to axially extending annular flange extensions 46, 47 at its outer periphery. The remote edges of each of the axial extensions 46, 47 are formed with further inwardly extending annular radial flange extensions 48 and 49 spaced somewhat from the main radial flange member 45. The main radial flange member and the annular radial extensions 48, 49 together constitute the driving clutch members of both ahead and astern clutches.

On either side of the radial flange member 45 and surrounding the input shaft 40 are mounted two hollow driven shafts 50, 51 each supported in bearings 52, 53 carried by the casing 44.

The hollow driven shafts 50, 51 are provided with gear pinions 54, 55, at their ends remote from the main radial flange 45 on the driving shaft, which mesh respectively with ahead and astern gear trains connected to the propeller shaft itself.

The ends of the two driven shafts 50, 51 adjacent the main radial flange 45 are provided with radial flanges 56, 57 whose outer diameter is slightly less than the internal diameter of the corresponding inturned radial flanges 48, 49 on the main radial flange.

The radial flange 56 on the driven shaft 50 associated with the ahead gear train (and referred to for convenience as the ahead driven shaft) is provided with an axial sleeve 58 at its periphery on which are mounted a pair of spaced annular driven clutch plates 59, 60 lying in the annular space between the main radial flange 45 and the inwardly extending radial flange extensions 48. The two driven clutch plates 59, 60 are splined to the axial sleeve 58 and are coated on both sides with a friction material, and are urged apart in an axial direction by a series of circumferentially spaced light springs 61 mounted on through-bolts which act to limit the axial clearance between the plates. One of the driven clutch plates 59 is also provided with a circumferential V-groove engaging a series of outwardly acting spring pressed detents 62 carried by the radial flange 56 on the ahead driven shaft 50, so as to tend to locate this plate, and indirectly also the second plate 60, in its disengaged position.

An intermediate annular driving clutch plate 63 is mounted between the two driven clutch plates 59, 60 and is splined to the axial extension 46 on the main radial flange member 45. This intermediate clutch plate 63 is provided with a similar V-groove on its external circumferential surface which engages with a series of spring pressed inwardly acting detents 64 arranged on the axial flange extension 46 so as to urge the intermediate clutch plate 63 into a central axial position in which it is normally out of contact with the two driven clutch plates 59, 60.

The main radial flange 45 on the driving shaft 40 is formed with an annular groove on its side adjacent the "ahead" driven shaft 50, and an annular pressure plate 65, which constitutes in effect an annular hydraulic piston, is arranged between the side of the main radial flange 45 and the adjacent driven clutch plate 60. The pressure plate 65 is splined at its periphery so as to rotate with the main radial flange member 45 and a spring 66 acts at all times to draw the pressure plate towards the flange member and to hold it out of contact with the driven clutch plates. The pressure plate 65 is formed with an annular flange 67 extending into the groove in the main radial flange and making a fluid tight fit with the inner and outer circumferential sides thereof, and a series of circumferentially spaced drillings 69 in this flange on the pressure plate communicate through pressure relief valves 68 (normally held closed by tight springs) with an annular slot 69 on the outer circumferential surface of the flange 67. Another series of circumferentially spaced radial drillings 70 (referred to as the "ahead" drillings for convenience) in the main radial flange member 45 communicate with the bore of the hollow driving shaft 40.

Normally (that is to say when the ahead clutch is disengaged) the outer annular plane surface of the pressure plate 65 lies in contact with the adjacent radial surface of the main radial flange member 45, and the outer periphery of the pressure plate is separated by a small clearance from the axial flange extension 46 on the main radial flange member. A drilling 71 in the main radial flange member leads from this clearance space to a permanent bleed valve 72 through which hydraulic fluid can escape into the interior of the main casing.

When pressure fluid is admitted to the series of "ahead" drillings 70 communicating with the annular groove in the main radial flange 45 the pressure in the groove first moves the pressure plate 65 away from the main radial flange 45 until it comes into contact with the adjacent driven clutch plate 60, and forms a fluid seal therewith to prevent hydraulic fluid escaping around the periphery of the pressure plate. The pressure relief valves 68 in the pressure plate then open (at a pressure of say 5 lbs./sq. in.) and the pressure fluid passes via the slot 69 into the annular space between the outer annular face of the pressure plate and the adjacent radial face of the main radial flange member (these faces being shown in contact with one another at 79), and exerts an axial thrust on the pressure plate which causes the two driven clutch plates 60, 59, and the intermediate driving clutch plate 63 to be sandwiched between the pressure plate 65 and the radial flange extension 48 on the main radial flange member. The friction surfaces of the clutch plates are urged strongly into contact with one another, and the ahead clutch is then engaged. The contact between the friction surfaces also acts as an oil seal and the pressurized oil can thus only escape at a relatively low rate, which is insufficient to reduce its pressure substantially, through the permanent bleed valve 72.

The construction of the "astern clutch" is similar to the construction described for the ahead clutch, but due to the lower power values that may have to be transmitted in the astern direction, it may be sufficient to include a single driven clutch plate 73, and to dispense with an intermediate driving clutch plate.

The supply of hydraulic fluid for operating the ahead and astern clutch in the assembly is delivered through the fluid conduits 23, 24 referred to above, from the output ports of the respective shuttle valve 11, to one end of the hollow driving shaft 40 of the clutch assembly. Within this hollow shaft is provided a concentric tubular conduit 75 leading to a point adjacent the main radial flange member 45, and forming an inner conduit 76, which is connected to the "ahead" drillings 70, and an annular surrounding conduit 77 which is connected to corresponding "astern" drillings 78 associated with the astern clutch. Each set of drillings 70, 78, is connected to the respective conduit 76, 77, through a pressure sealing valve, comprising a movable valve piston 80, 81 sliding in a bore, the piston being acted upon in one direction by the pressure in the respective conduit, and in the opposite direction by a spring. The spring may be relatively light, sufficient for example to maintain a pressure of say 5 lbs./sq. in. in the conduit, and the valve acts in effect as a pressure relief valve arranged directly in the hydraulic conduit through which pressure fluid is supplied to the clutch. When the valve 80 or 81 is lifted off its seating by the pressure in the respective conduit the hydraulic fluid passes through the respective set of drillings to engage the ahead or astern clutch as the case may be.

When the pressure in either conduit 76, 77 falls the respective sealing valve closes at once, and although the small amount of fluid in the radial drillings 70, 78 and other parts of the clutch can then escape through the bleed valve 72 as the clutch disengages, the main mass of fluid in the conduit is "locked up" and cannot escape. Thus it will be seen that when pressure fluid is supplied to either conduit to operate the respective clutch, the delay or lag before the clutch actually engages is relatively short and is unaffected by the length of the delivery conduit, since this conduit is at all times maintained full.

What we claim as our invention and desire to secure by Letters Patent is:

1. A marine propulsion unit of the twin-screw type including two prime movers, two fluid operated clutches associated respectively with the two prime movers, and two propellers coupled respectively to the prime movers through the said clutches, a pump driven by each prime mover and arranged to supply fluid under pressure through a hydraulic circuit to operate the clutch associated with that prime mover, auxiliary motor means for starting one prime mover, and a hydraulic interconnecting duct between the hydraulic circuits of the two clutches, and flow control means in said interconnecting duct which when open permits pressure fluid from one circuit to operate both clutches.

2. A marine propulsion unit as claimed in claim 1 including a control valve in the hydraulic circuit through which fluid is delivered to each clutch and arranged at a point in each circuit between the respective pump and the junction with the interconnecting duct, and means for closing this control valve to prevent fluid flowing in the reverse direction towards the pump, when the pressure of the fluid supplied by the pump falls below a predetermined value.

3. A marine propulsion unit as claimed in claim 2 in which each clutch includes a pressure cylinder and means for permitting permanent escape of fluid from the said cylinder, and including a pressure sealing valve arranged directly in the hydraulic circuit between the pump and the cylinder and adjacent the latter and arranged to open when the pressure in the circuit rises above a predetermined value and to close when the pressure falls below this value to prevent fluid escaping from the whole circuit when the cylinder empties.

4. A marine propulsion unit as claimed in claim 3 in which each clutch comprises two movable coaxial friction members, and the cylinder comprises an annular chamber coaxial with the two friction members, and including an annular ram piston lying within the annular chamber and arranged to move the friction members respectively towards and away from one another, and an internal fluid supply passage coaxial with the two friction members and communicating with the annular chamber and with the hydraulic circuit, and in which the pressure sealing valve is housed within the internal passage.

5. A marine propulsion unit as claimed in claim 1 including parallel ahead and astern transmission paths between each prime mover and the respective propeller, and a fluid operated clutch in each transmission path, and in which the interconnecting duct is connected to the hydraulic circuit associated with both ahead clutches.

6. A marine propulsion unit as claimed in claim 5 including a control valve in the hydraulic circuit through which fluid is delivered to each clutch and arranged at a point in each circuit between the respective pump and the junction with the interconnecting duct, and means for closing this control valve to prevent fluid flowing in the reverse direction towards the pump, when the pressure of the fluid supplied by the pump falls below a predetermined value.

7. A marine propulsion unit as claimed in claim 6 in which each control valve is of the shuttle type and including a two-way pilot valve hydraulically connected to the same pump and arranged to deliver pressure fluid selectively to opposite ends of a shuttle valve to move it into one or other of its operative positions, and means for centralizing the shuttle valve in an intermediate position in which the supply of fluid to both the ahead and astern clutches of that respective prime mover is shut off, when the pressure fluid to the pilot valve fails.

References Cited in the file of this patent
UNITED STATES PATENTS

| | | |
|---|---|---|
| 2,547,660 | Prince | Apr. 3, 1951 |
| 2,589,788 | Fell | Mar. 18, 1952 |
| 2,608,051 | Nettel | Aug. 26, 1952 |